May 1, 1956 — S. DALE — 2,743,664
DISPOSABLE COFFEE BREWER
Filed Jan. 23, 1952 — 2 Sheets-Sheet 1
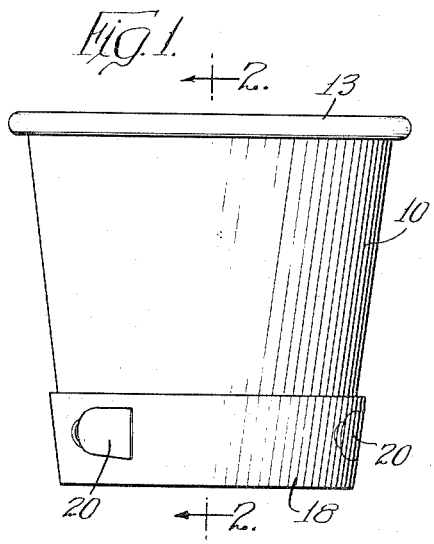
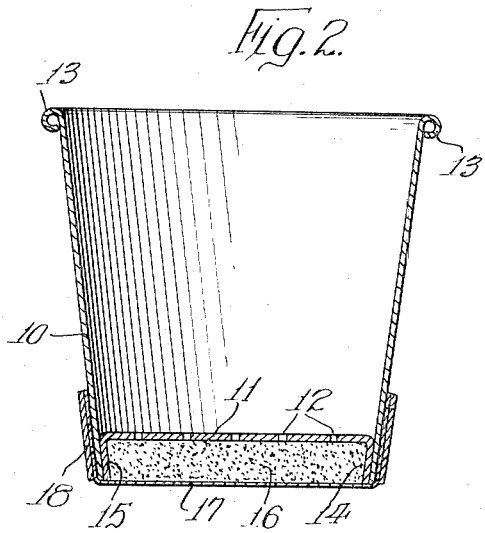
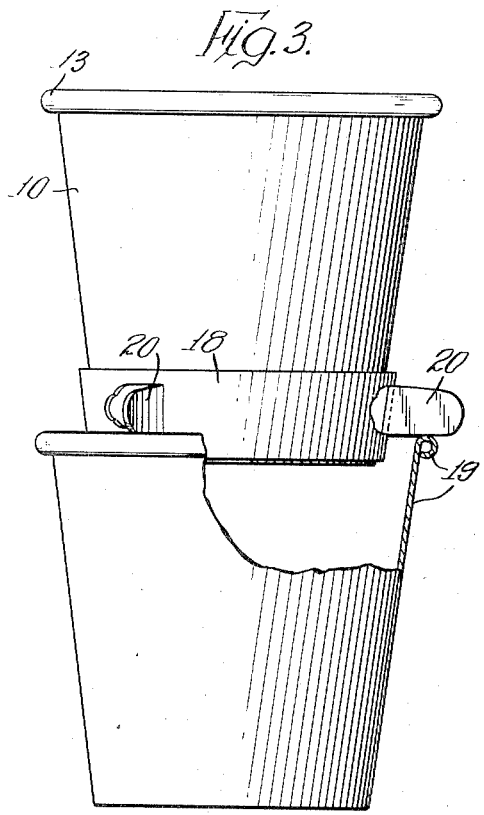
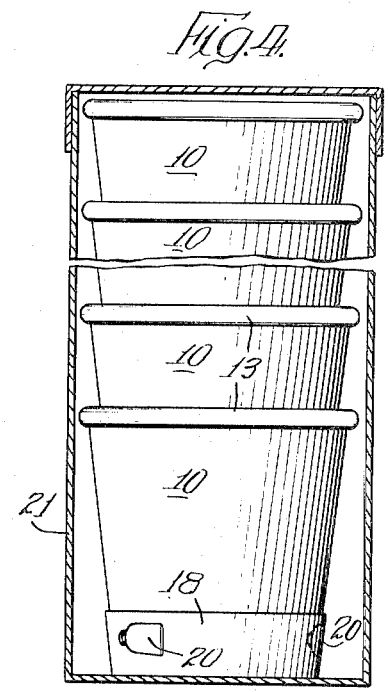
INVENTOR.
Sheldon Dale
BY
Attys.

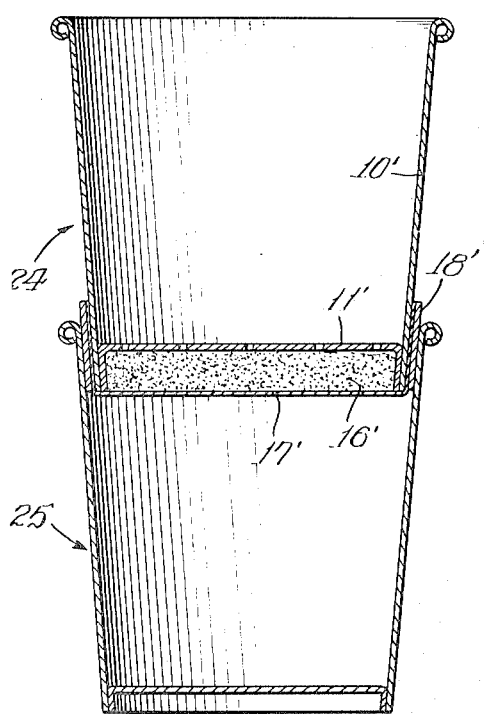
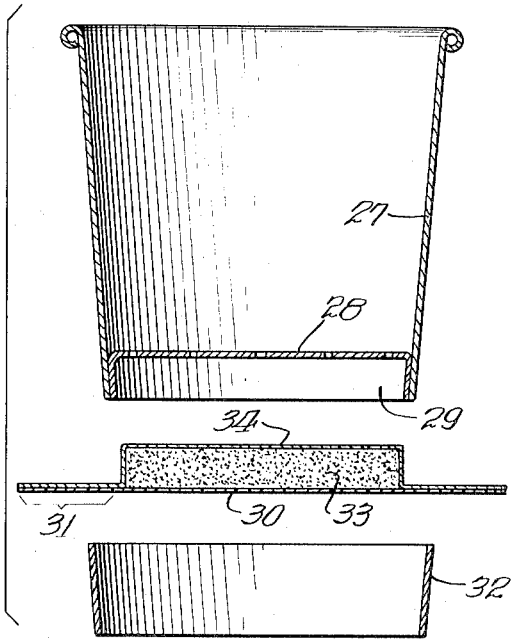
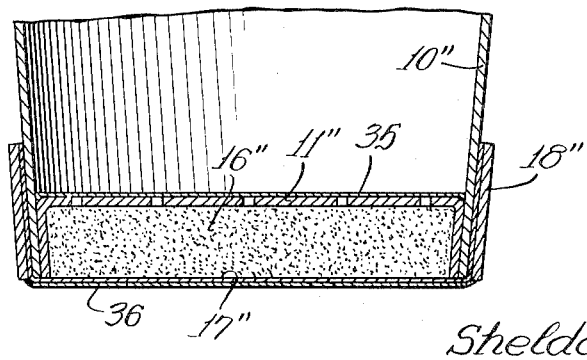

United States Patent Office 2,743,664
Patented May 1, 1956

2,743,664

DISPOSABLE COFFEE BREWER

Sheldon Dale, Chicago, Ill., assignor to Cory Corporation, Chicago, Ill., a corporation of Delaware Application January 23, 1952, Serial No. 267,809

3 Claims. (Cl. 99—295)

The invention relates generally to means for brewing a beverage such as coffee, tea, or the like, and more particularly to a disposable brewing means.

One object of the invention is to provide a beverage brewer constructed in such manner and of such materials that it may be employed once and then discarded without material economic loss.

Another object is to provide an inexpensive, disposable receptacle containing a charge of coffee, tea, or the like, and capable of serving as the upper part of a "drip" type brewer, the receptacles being nestable for convenience and economy in storage and shipping.

A further object is to provide a beverage brewer composed of two receptacles made of paper or like disposable material, one of the receptacles containing a charge of coffee, tea, or the like, and the other serving as a receiver for the beverage and as a cup from which it may be drunk, the two receptacles being separably joined.

Other objects and advantages will become apparent from the following detailed description taken in connection with the accompanying drawings, in which:

Fig. 1 is an elevational view of one embodiment of the invention.

Fig. 2 is a diametrical, sectional view taken approximately along the line 2—2 of Fig. 1.

Fig. 3 is an elevational view with a portion broken away showing the unit of Figs. 1 and 2 in "in use" position.

Fig. 4 is a broken view, partially in elevation, and partially in section, showing the units of Figs. 1 and 2 packaged for storage or shipment.

Fig. 5 is a diametrical sectional view of another embodiment of the invention, particularly adapted for use in coin-operated dispensing machines.

Fig. 6 is an exploded view in diametrical section of a third embodiment of the invention.

Fig. 7 is a fragmentary, enlarged, diametrical sectional view of still another embodiment of the invention.

While the invention is susceptible of various modifications and alternative constructions and is adaptable for use in a variety of modes, it is here shown and will hereinafter be described in a number of different embodiments and adaptations for different uses. It is not intended, however, that the invention is to be limited thereby to the specific constructions disclosed. On the contrary, it is intended to cover all modifications and alternative constructions falling within the spirit and scope of the invention as defined in the appended claims.

Considering first the basic structure, the unit or element constituting the principal part of the invention comprises in the main a receptacle 10 having an open top and a bottom 11 made perforate by the inclusion of a plurality of small holes 12. Inasmuch as the underlying concept of this invention is a beverage brewing means that can, if desired, be used once only and then discarded, the receptacle 10 is made of some inexpensive, disposable material capable, however, of withstanding hot water for a limited period of time. By way of example, the receptable may be made of paper treated in well known manner to give it the necessary rigidity and resistance to hot water for an adequate period of time. Herein the top edge is shown as rolled back to form a strengthening and reinforcing bead 13. The bottom 11 is spaced upwardly from the lowermost edge of the receptacle 10 to provide a chamber 14. In the various embodiments here shown, the bottom 11 is provided with a downwardly extending annular flange 15 of a width equal to the desired depth of the chamber 14, which flange serves as the means by which the bottom is secured in permanent, fluid-tight relationship to the side walls of the receptacle and which also serves to strengthen and reinforce the receptacle. To the extent thus far described the structure is common to all embodiments shown.

In the embodiment shown in Figs. 1 to 4, inclusive the brewing unit is ready for use as the upper, charge containing, hot water receiving portion of a beverage brewer commonly known as the "drip" type. To that end the chamber 14 is filled with a charge 16 of coffee grounds, tea leaves, or other ingredients from which a beverage is to be made by the trickling of hot water therethrough. It will be appreciated that the charge 16 is proportioned to the size of the receptacle to result in a beverage of the desired strength when the receptacle is filled with hot water to an indicated level, the strength of the beverage being, of course, variable within limits by varying the quantity of hot water employed. The charge 16 is retained within the chamber 14 through the medium of a closure 17 in the form of a sheet of filter paper or like material. The sheet or disk of filtering material forming the closure 17 may be permanently secured in any desired manner and herein is shown held in place by a narrow band 18 which is forced upwardly over the lower end of the receptacle 10 and over the portion of the closure 17 that extends beyond the peripheral edge of the bottom of the receptacle, and by the action described is folded back against the side walls of the receptacle between the receptacle and the band.

The band 18, in addition to serving as a retaining means for the closure 17 and of course as a reinforcing means for the base of the receptacle 10, also serves as a means for supporting the receptacle 10 over the mouth or opening of a receptacle 19 for receiving the brewed beverage. To that end the band 18 is provided with a plurality of (not less than three) cut-out tabs or ears 20, which initially lie in the plane of the band 18 but may be lifted and bent outwardly to extend radially so that the unit of Figs. 1 and 2 may rest over a receptacle as shown in Fig. 3.

It is believed apparent from what has been stated above that the unit so far described is readily usable as the upper portion of a so-called "drip" beverage brewer. All that is required is that an adequate quantity of water be heated, the water poured into the receptacle 10 and permitted to pass through the charge 16 into another receptacle 19. When the hot water has all run through the charge 16, the receptacle 10 may be thrown away, burned or otherwise disposed of. The receptacle 19 receiving the brewed beverage may be a cup, glass or other utensil from which the beverage is to be drunk. While it is contemplated that the unit will be of a size to provide beverage for a single individual, it may without departing from the principle of this invention be made of larger size.

The receptacle 10 is here shown as of generally frusto-conical construction. This has the advantage that the brewing units may be nested one within the other, as shown in Fig. 4, for economy in space, in storage or transportation. A plurality of such brewing units so nested may be packaged in a hermetically sealed carton 21 to preserve the freshness of the charge 16. Thus when so packaged the brewing units can be stored or shipped for a considerable period of time without having the charge 16 lose its strength or quality. The carton 21, of course, should be small enough to contain only that that number of brewing units as will likely be consumed in a comparatively short period of time.

In the embodiment shown in Fig. 5, the brewing unit is adapted for use in coin-operated dispensing machines. Thus in this embodiment the brewing means or unit constitutes a complete brewing apparatus of the "drip" type. To that end the unit comprises two parts 24 and 25 separably joined with one another. The upper part 24 is composed of the unit disclosed in Figs. 1 and 2. Suffice it to say, therefore, that there is a receptacle 10' made of disposable material. This receptacle has a perforate bottom 11' and carries a charge 16' of coffee grounds, tea leaves, or the like. The charge 16' is retained in the receptacle by a closure 17' of filter paper or the like and the lower portion of the receptacle 10' has therearound a band 18' for reinforcing the same and also for retaining the closure 17'. This band could be constructed without the cut-out tabs or ears 20 if desired.

The part 25 is a simple cup-like receptacle frusto-conical in shape with a diameter at the top such that the receptacle 10' is receivable therein to a sufficient depth and snugly enough to retain the two parts firmly enough together so that they will remain as a unit during their passage through the dispensing machine and may, after the beverage has passed into the part 25, be readily separated by the individual who purchased the beverage. Like the part 24, the part 25 is preferably made of some inexpensive, disposable material, such as paper, in order that the entire unit may be discarded after the beverage has been consumed.

While the embodiments of the invention thus far described and particularly the receptacles 10 and 10' have been treated as disposed of after a single use, it is a well known fact that presently manufactured drinking cups, though intended for a single use only, are capable of and sturdy enough for repeated use. Thus, while in some instances it is desirable and economically feasible to destroy the receptacle after a single use only, there are many circumstances, particularly when used in the home, where it would be preferable not to destroy the receptacle after a single use. While the receptacle itself might withstand repeated use, it is apparent of course that the charge 16 is spent after a single use, and thus the receptacle 10 is not reusable unless and until the charge 16 is renewed.

In Fig. 6 there is disclosed an embodiment of the invention so constructed that the charge is renewable. To that end there is provided a receptacle 27 having a perforate bottom 28 spaced upwardly from the lowermost edge of the receptacle to provide a chamber 29 for receiving a charge of coffee grounds, tea leaves, or the like. This receptacle could, like the receptacles 10 and 10', be made of paper or similar disposable material cheap enough to be thrown away after a few uses only. However, since, as will be presently described, the charge is renewable, the receptacle 27 may preferably be made of some more permanent material than paper. As in the previously described embodiments, a closure 30 is provided for the chamber 29, this closure being in the form of a sheet or disk of material through which the beverage will filter. The sheet of material forming the closure 30 is made large enough so that there is an ample marginal portion 31 which may be folded back upon the receptacle 27 and thus held in place by a band 32 forced up over this marginal portion and the lower end of the receptacle 27.

To facilitate renewing of the charge in the chamber 29, a proper quantity of coffee grounds, tea leaves or the like, shown at 33, is enclosed between the closure 30 and a second sheet or disk 34 of filtering material. This packet is shaped to be receivable in the chamber 29 preferably with a tight fit at the periphery in order that it may be conveniently inserted and yet not leave a comparatively open path around the packet through which the water might tend to flow rather than passing through the charge.

Turning now to Fig. 7, the embodiment therein disclosed comprises a receptacle 10" having a bottom 11", a charge 16", and a closure 17" of filtering paper or the like, and a retaining ring 18", all as more particularly disclosed and described in connection with the embodiment shown in Figs. 1 to 3, inclusive. Herein, however, provision is made for hermetically sealing the charge in each individual unit. To that end there is placed over the bottom 11" a film or seal 35 of a material that is impervious to air but which is soluble in hot water and is not harmful when taken internally by humans. A similar such film or coating 36 is placed over that area of the closure 17" exposed to the charge 16". This film or coating 36 may, by way of example, be a relatively tasteless sugar, or any one of numerous other suitable products that will readily suggest themselves to those skilled in the art.

I claim as my invention:

1. A beverage brewing unit disposable in part or in its entirety after use comprising a first receptacle having side walls and a bottom wall formed integrally with said side walls and spaced upwardly from the lower edge of said side walls to form the upper wall of a chamber adapted to receive a charge of beverage flavoring material therein, said bottom being perforate to distribute uniformly over said chamber liquid poured into said receptacle, said receptacle being composed of waterproof paper with the side walls tapering inwardly from the mouth to the closed end of the receptacle to form a frustum of a cone, a closure for the bottom side of said chamber composed of a filter sheet stretched over the lower edge of said side walls and having a diameter greater than that of said side walls at the lower edge thereof to be foldable back upon the outer surface thereof, a charge of beverage flavoring material in said chamber and a frusto-conical band of the same conicity as the side walls and of a diameter to receive therein the lower end portion of said side walls and the folded-back portion of said filter sheet, and a second receptacle of waterproof paper, said second receptacle having an open top, a closed imperforate bottom, and side walls near the top thereof in the form of a frustum of an inverted cone, the side walls of said second receptacle at least near the top having generally the same conicity as the band encircling said first receptacle with an inside diameter just very slightly larger than the outside diameter of said band to receive said band and the encircled portion of said first receptacle therein for a frictional, disengageable joining of said two receptacles into a single unit.

2. A beverage brewing unit disposable in part or in its entirety after use comprising a first receptacle having side walls and a bottom wall formed integrally with said side walls and spaced upwardly from the lower edge of said side walls to form the upper wall of a chamber adapted to receive a charge of beverage flavoring material therein, said bottom being perforate to distribute uniformly over said chamber liquid poured into said receptacle, said side walls tapering inwardly from the mouth to the closed end of the receptacle to form a frustum of a cone, a closure for the bottom side of said chamber composed of a filter sheet stretched over the lower edge of said side walls and having a diameter greater than that of said side walls at the lower edge thereof to be foldable back upon the outer surface thereof, a charge of beverage flavoring material in said chamber and a frusto-conical band of the same conicity as the side walls and of a diameter to receive therein the lower end portion of said side walls and the folded-back portion of said filter sheet, and a second receptacle of waterproof paper, said second receptacle having an open top, a closed imperforate bottom, and side walls near the top thereof in the form of a frustum of an inverted cone, the side walls of said second receptacle at least near the top having generally the same conicity as the band encircling said first receptacle with an inside diameter just very slightly larger than the outside diameter of said band to receive said band and the encircled portion of said first receptacle therein for a frictional, disengageable joining of said two receptacles into a single unit.

3. A beverage brewing unit disposable in part or in its entirety after use comprising a first receptacle having side walls and a bottom wall formed integrally with said side walls and spaced upwardly from the lower edge of said side walls to form the upper wall of a chamber adapted to receive a charge of beverage flavoring material therein, said bottom being perforate to distribute uniformly over said chamber liquid poured into said receptacle and said side walls at the lower end thereof sloping uniformly inwardly in a downward direction, a closure for the bottom side of said chamber composed of a filter sheet stretched over the lower end of said receptacle, said sheet being substantially larger than the bottom of said receptacle to have an excess portion foldable back upon the outer surface of said side walls, a charge of beverage flavoring material in said chamber, and an annular band having portions of the same slope as the lower end of said side walls and being slightly larger circumferentially to be receivable over the sloping lower end portion of said side walls and the folded-back portion of said filter sheet in encircling relationship, and a second receptacle of waterproof paper, said second receptacle having an open top, a closed imperforate bottom, and side walls which at least near the top thereof conform in shape to the annular band of said first receptacle and being slightly larger than said annular band to receive said band and the encircled portion of said first receptacle therein for a frictional, disengageable joining of said two receptacles into a single unit.

References Cited in the file of this patent

UNITED STATES PATENTS

| | | |
|---|---|---|
| 115,134 | Tinkham | May 23, 1871 |
| 136,703 | Childs | Mar. 11, 1873 |
| 299,582 | Rice | June 3, 1884 |
| 1,592,395 | Sulzberger | July 13, 1926 |
| 1,876,474 | Starkey | Sept. 6, 1932 |
| 1,920,268 | Moriya | Aug. 1, 1933 |
| 1,983,142 | Moriya | Dec. 4, 1934 |
| 2,062,897 | Michel et al. | Dec. 1, 1936 |
| 2,451,195 | Brown | Oct. 12, 1948 |
| 2,539,771 | Chambers | Jan. 30, 1951 |

FOREIGN PATENTS

| | | |
|---|---|---|
| 21,770 | Great Britain | 1896 |
| 660,983 | Germany | June 8, 1938 |
| 812,235 | France | Feb. 1, 1936 |
| 902,986 | France | Jan. 5, 1945 |